United States Patent [19]

Bergen et al.

[11] 4,425,577

[45] Jan. 10, 1984

[54] TELEVISION CAMERA EQUIPPED WITH A COLOR-SEPARATING ARRANGEMENT DISPOSED BEHIND THE OBJECTIVE

[75] Inventors: Franciscus H. M. Bergen; Wolter W. J. Degger; Sing L. Tan, all of Eindhoven, Netherlands

[73] Assignee: U.S. Philips Corporation, New York, N.Y.

[21] Appl. No.: 326,865

[22] Filed: Dec. 3, 1981

[30] Foreign Application Priority Data

Dec. 4, 1980 [NL] Netherlands ................ 8006609

[51] Int. Cl.³ .............................................. H04N 9/09
[52] U.S. Cl. ...................................... 358/55; 350/172
[58] Field of Search ................ 358/55, 50; 350/169, 350/170, 172, 173

[56] References Cited

U.S. PATENT DOCUMENTS

| 3,202,039 | 8/1965 | De Lang et al. | 88/1 |
| 3,802,763 | 4/1974 | Cook | 358/55 |
| 3,945,034 | 3/1976 | Suzuki | 358/55 |
| 4,084,179 | 4/1978 | Sekiguchi | 358/55 |
| 4,109,279 | 8/1978 | Hirose | 358/55 |
| 4,161,349 | 7/1979 | Norman | 358/55 |
| 4,323,918 | 4/1978 | Bendell | 358/55 |

FOREIGN PATENT DOCUMENTS 2,064,757  7/1972  Fed. Rep. of Germany ........ 358/55

*Primary Examiner*—Michael A. Masinick
*Attorney, Agent, or Firm*—Marc C. Schechter

[57] ABSTRACT

In order to minimize the effects of magnetic fields in a color television camera, the color prism arrangement is constructed so that at least two camera tubes can be arranged parallel to each other.

6 Claims, 4 Drawing Figures

TELEVISION CAMERA EQUIPPED WITH A COLOR-SEPARATING ARRANGEMENT DISPOSED BEHIND THE OBJECTIVE

BACKGROUND OF THE INVENTION

The invention relates to a television camera equipped with a color-separating prism assembly disposed behind the objective. The assembly comprises a plurality of surfaces which adjoin dichroic layers of mutually different colors. In the camera, the separated light beams which emerge from the prism assembly, are transmitted to camera tubes. In the prism assembly, passing in the direction of the light which enters the prism assembly, there are provided, twice in succession, a plane air-glass transition and a dichroic layer. Each layer encloses an angle with the air-glass transition and adjoins a plane glass surface. At least one air-glass transition and the associated dichroic layer enclose an angle smaller than 30° with a plane which is normal to the nonreflected optical axis.

Such a television camera is known from U.S. Pat. No. 3,202,039 (Netherlands Patent Specification No. 113,911). The known television camera has the advantage that the glass-length of the prism assembly to be traversed by the light can be comparatively small. The prism assembly thus obtained can be comparatively compact because the totally reflecting air-glass transitions are plane. As a result of this, one zone of such an air-glass transition may serve both as an entrance surface for the light in the relevant prism section and as a totally reflecting surface for the light which is reflected by the dichroic layer associated with the air-glass transition. Since at least one air-glass transition and the associated dichroic layer enclose an angle smaller than 30° with a surface which is normal to the nonreflected optical axis, annoying polarization effects in the traversing light or color variations across the lens pupil and/or the image field are avoided.

In the known television camera the axes of the three camera tubes are arranged in different directions relative to each other. An arrangement of camera tubes in which the tube axes extend in different directions has the drawback that external magnetic fields, for example the earth's magnetic field, have a different influence on the electron beam in each tube. When the position of the television camera is changed this may give rise to registration errors. A further drawback is that with the known set-up of the prism assembly and camera tubes a compact design is not easy to realize.

SUMMARY OF THE INVENTION

It is an object of the invention to mitigate these problems. To this end a television camera of the type described above includes at least one prism having at least two interfaces of which are parallel to each other. At least one of the interfaces is provided with a dichroic layer.

Suitably, the parallel light beams emerging from the prism arrangement contain the green and the red spectral components of the light which is incident on the arrangement, because registration errors for red and green color pictures are most annoying. A compact set up of the prism arrangement and camera tubes is possible, so that a camera of small dimensions can be obtained. The third camera tube, which receives the blue spectral component of the light, may, for example, be accommodated in the grip of the camera.

DESCRIPTION OF THE PREFERRED EMBODIMENTS

Figure 1:
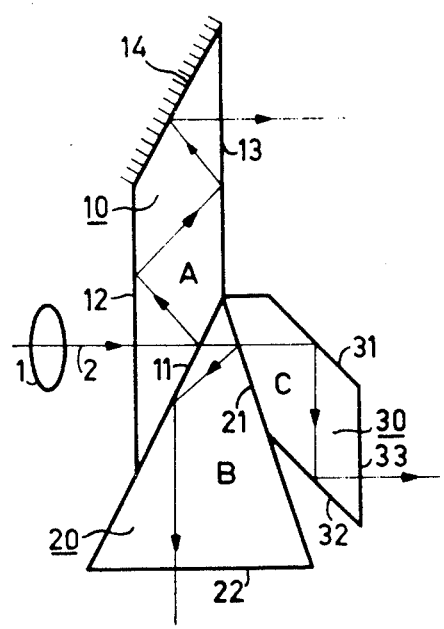
FIGS. 1, 2, 3 and 4 schematically show four embodiments of the television camera in according to the invention.

In FIG. 1, the prism assembly comprises three prisms 10, 20, and 30. The exit surface 11 of the prism 10 is provided with a dichroic layer which reflects the green component of the light. The exit surface 21 of the prism 20 is provided with a dichroic layer which reflects the blue component of the light. The light from the scene passes through the objective 1 and, via the entrance surface 12 of the prism 10, it is incident on the exit surface 11. The entrance surface 12 is normal to the optical axis 2. The exit surface 11 makes an angle smaller than 30° with a plane perpendicular to the optical axis 2.

The angle which the dichroic layer at surface 11 makes with the unreflected optical axis 2 is therefore greater than 30°. Since the dichroic layer on the exit surface 11 reflects the green component of the light, this layer determines the color separation both at the short wavelength end (blue edge) and at the long wavelength end (red edge). The dichroic layer on the exit surface 21 of the prism 20 may therefore comply with less stringent requirements as regards the accuracy of the wavelength edges. The green component of the light reflected by the surface 11 is reflected by the surface 12, subsequently by the surface 13 of the prism 10 and finally by the reflecting surface 14 of the prism 10. As the surface 14 is arranged parallel to the surface 11 and the surface 12 parallel to the surface 13, the green light beam emerging from the prism 10 is parallel to the optical axis 2.

The light beam transmitted by the dichroic layer on the surface 11 is incident on the exit surface 21 of the prism 20 which is also provided with a dichroic layer. The surface 21 subtends an angle greater than 30° with the plane perpendicular to the optical axis 2. The red light component transmitted by the dichroic layer is reflected by the surface 31, subsequently by the surface 32 of the prism 30 and emerges from the prism 30 via the surface 33. As the surfaces 32 and 31 are parallel to each other and the surface 33 is parallel to the surface 12, the red light beam emerging from the prism section 30 is parallel to the optical axis 2 and is thus parallel to the green light beam which emerges from the prism 10.

The blue component of the light beam reflected by the dichroic layer on the surface 21 is reflected by the surface 11 and subsequently emerges from the prism 20 via the surface 22.

Figure 2:
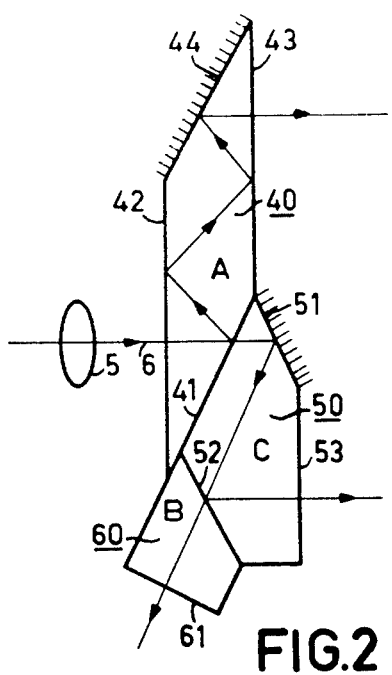

In the embodiment shown in FIG. 2, the prism 40 of the prism arrangement assembly is identical to the prism 10 of the prism assembly in FIG. 1. The dichroic layer on the exit surface 41 of the prism 40 reflects the green component of the light beam which is incident on the entrance surface 42 via the lens 5. This green component consequently emerges from the prism 40 after reflection by the is 6surface 42, the surface 43 and the reflecting surface 44.

After reflection by the reflecting surface 51 of the prism 50 the light beam transmitted by the dichroic layer on the surface 41 is incident on the surface 52 of the prism 50, which surface 52 is provided with a dichroic layer. The surface 52 subtends an angle greater than 30° with a surface normal to the optical axis 6. The red component of the light beam reflected by the dichroic layer emerges from the prism 50 via the surface 43. As the surface 51 is parallel to the surface 52, the red light beam emerging from the prism 50 is parallel to the optical axis 6 and thus parallel to the green light beam emerging from the prism 40.

The blue component of the light beam transmitted by the dichroic layer on the surface 52 emerges from the prism 60 via the surface 61.

Figure 3:
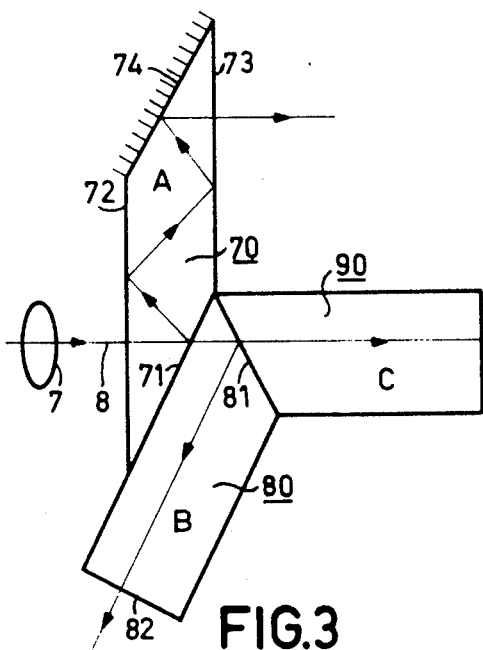

In the embodiment shown in FIG. 3 the prism 70 of the prism assembly is identical to the prism 10 in the embodiment shown in FIG. 1. The dichroic layer provided on the exit surface 71 reflects the green component of the light beam which is incident on the front surface 72 via the lens 7. The green component emerges from the prism 70 via the exit surface 73 parallel to the optical axis 8 after reflection by the front surface 72, the surface 73, and the reflecting surface 74.

The beam transmitted by the dichroic layer on the exit surface 71 is incident on the dichroic layer on the exit surface 81 of the prism 80. The surface 81 makes an angle greater than 30° with a plane perpendicular to the optical axis 8. The dichroic layer on the exit surface 81 reflects the blue component of the light beam and transmits the red component without refraction. The red beam which emerges from the prism via the exit surface 91 coincides with the optical axis 8 and is thus parallel to the green beam emerging from the prism 70. The blue beam which is reflected by the dichroic layer on the surface 81 emerges from the prism 80 via the exit surface 82.

Figure 4:
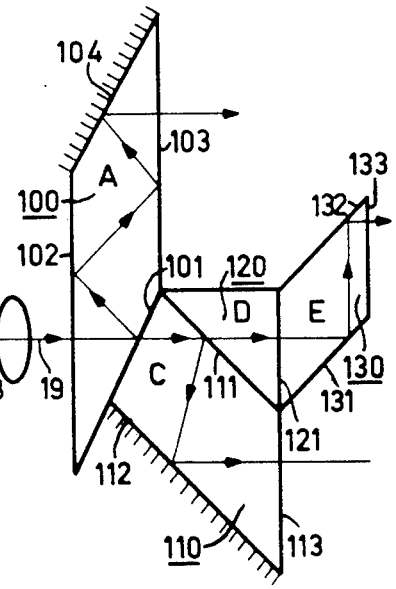

In the embodiment shown in FIG. 4 the prism 100 of the prism assembly is identical to the prism 10 of the embodiment shown in FIG. 1. It will therefore be evident that the green light beam emerging from the prism 100 is parallel to the optical axis 19. The light beam which is transmitted by the dichroic layer on the exit surface 101 of the prism 100 is incident on the dichroic layer provided on the exit surface 111 of the prism 110. This dichroic layer transmits, for example, the blue component of the light beam and reflects the red component. After reflection by the reflecting surface 112 of the prism 110 the red component emerges from the prism via the exit surface 113. As the surfaces 112 and 111 are parallel to each other, the red beam emerging from the prism 110 is parallel to the optical axis 19 and thus parallel to the green beam. Via the prism 120 and the prism 130 the blue light beam transmitted by the dichroic layer on the surface 111 emerges from the prism 130 via the exit surface 133 after being reflected by the surface 131 and subsequently by the surface 132. As the surfaces 131 and 132 are parallel, the blue beam which emerges from the prism 130 is parallel both to the red beam and to the green beam.

What is claimed is:

1. A television camera comprising:
an objective;
a color-separating prism assembly disposed behind the objective, said assembly having an entrance surface and three exit surfaces, light entering the assembly through the entrance surface being separated into different colors emerging from the exit surfaces;
three camera tubes, one tube arranged in the path of light emerging from each exit surface;
characterized in that the prism assembly comprises:
a first prism having an optical axis and a plurality of planar surfaces, one such surface being an entrance surface perpendicular to the optical axis, one other surface having a dichroic layer thereon; and
a second prism having a plurality of planar surfaces, one surface having a dichroic layer thereon;
wherein the surface of the first prism bearing the dichroic layer is arranged adjacent a surface of the second prism without a dichroic layer thereon, said adjacent surfaces being separated by an air gap, said first and second prisms arranged so that the optical axis passes through both dichroic layers;
wherein the surface of the first prism bearing the dichroic layer subtends an angle less than 30° with a plane perpendicular to the optical axis; and
wherein the first prism has at least one other surface parallel to the surface of the first prism bearing the dichroic layer.

2. A television camera as claimed in claim 1, characterized in that the dichroic layer on the first prism reflects green light.

3. A television camera as claimed in claim 2, characterized in that the dichroic layer on the second prism subtends an angle greater than 30° with a plane perpendicular to the optical axis.

4. A color-separating prism assembly having an entrance surface and three exist surfaces, said assembly comprising:
a first prism having an optical axis and a plurality of planar surfaces, one such surface being an entrance surface perpendicular to the optical axis, one other surface having a dichroic layer thereon; and
a second prism having a plurality of planar surfaces, one surface having a dichroic layer thereon;
wherein the surface of the first prism bearing the dichroic layer is arranged adjacent a surface of the second prism without a dichroic layer thereon, said adjacent surfaces being separated by an air gap, said first and second prisms arranged so that the optical axis passes through both dichroic layers;
wherein the surface of the first prism bearing the dichroic layer subtends an angle less than 30° with a plane perpendicular to the optical axis; and
wherein the first prism has at least one other surface parallel to the surface of the first prism bearing the dichroic layer.

5. A color-separating prism assembly as claimed in claim 4, characterized in that the dichroic layer on the first prism reflects green light.

6. A color-separating prism assembly as claimed in claim 5, characterized in that the dichroic layer on the second prism subtends an angle greater than 30° with a plane perpendicular to the optical axis.

* * * * *